(12) United States Patent
Kunert et al.

(10) Patent No.: US 6,912,874 B2
(45) Date of Patent: Jul. 5, 2005

(54) DEVICE AND PROCESS FOR INTRODUCING GASES INTO A HOT MEDIUM

(75) Inventors: Christian Kunert, Mainz (DE); Werner Kiefer, Mainz (DE); Hildegard Roemer, Karben (DE); Uwe Kolberg, Mainz-Kastel (DE)

(73) Assignee: Schott Glas, Mainz (DE)

( * ) Notice: Subject to any disclaimer, the term of this patent is extended or adjusted under 35 U.S.C. 154(b) by 206 days.

(21) Appl. No.: 09/943,739

(22) Filed: Sep. 4, 2001

(65) Prior Publication Data

US 2002/0069673 A1 Jun. 13, 2002

(30) Foreign Application Priority Data

Sep. 4, 2000 (DE) .......................................... 100 43 872

(51) Int. Cl.⁷ .............................. C03B 5/16; F16K 49/00
(52) U.S. Cl. ........................ 65/356; 65/134.5; 137/340; 137/375
(58) Field of Search ................................ 137/340, 375; 65/134.5, 356, 178, 32.1

(56) References Cited

U.S. PATENT DOCUMENTS 2,155,315 A * 4/1939 Kremers ..................... 422/119
3,397,973 A 8/1968 Rough
4,550,898 A 11/1985 Labate
4,600,425 A * 7/1986 Krumwiede et al. .......... 65/178

FOREIGN PATENT DOCUMENTS

| DE | 4136552 | 5/1993 | | |
|---|---|---|---|---|
| DE | 19947729 | 4/2000 | | |
| GB | 658141 | 10/1951 | | |
| JP | 2-80328 | * | 3/1990 | ................ 65/134.5 |
| JP | 4-02094364 | * | 4/1990 | |

OTHER PUBLICATIONS

Abstract JP 63035434 A.

Abstract JP 55116633 A.

Abstract JP 01028245 A.

Patent Abstracts of Japan, Jun. 12, 1990, vol. 0142, No. 70 (C–0727), & Takahashi Shiro, "Treatment of Molten Glass," Mar. 20, 1990, JP 02 080328 A.

* cited by examiner

*Primary Examiner*—Dionne A. Walls
(74) *Attorney, Agent, or Firm*—Millen, White, Zelano & Branigan, P.C.

(57) ABSTRACT

This invention relates to a device and a process for introducing gases into a hot medium, whereby device (1) contains a pipe (2) for introducing gas and a cooling jacket (3) that encases pipe (2).

20 Claims, 3 Drawing Sheets

DEVICE AND PROCESS FOR INTRODUCING GASES INTO A HOT MEDIUM

Figure 1:
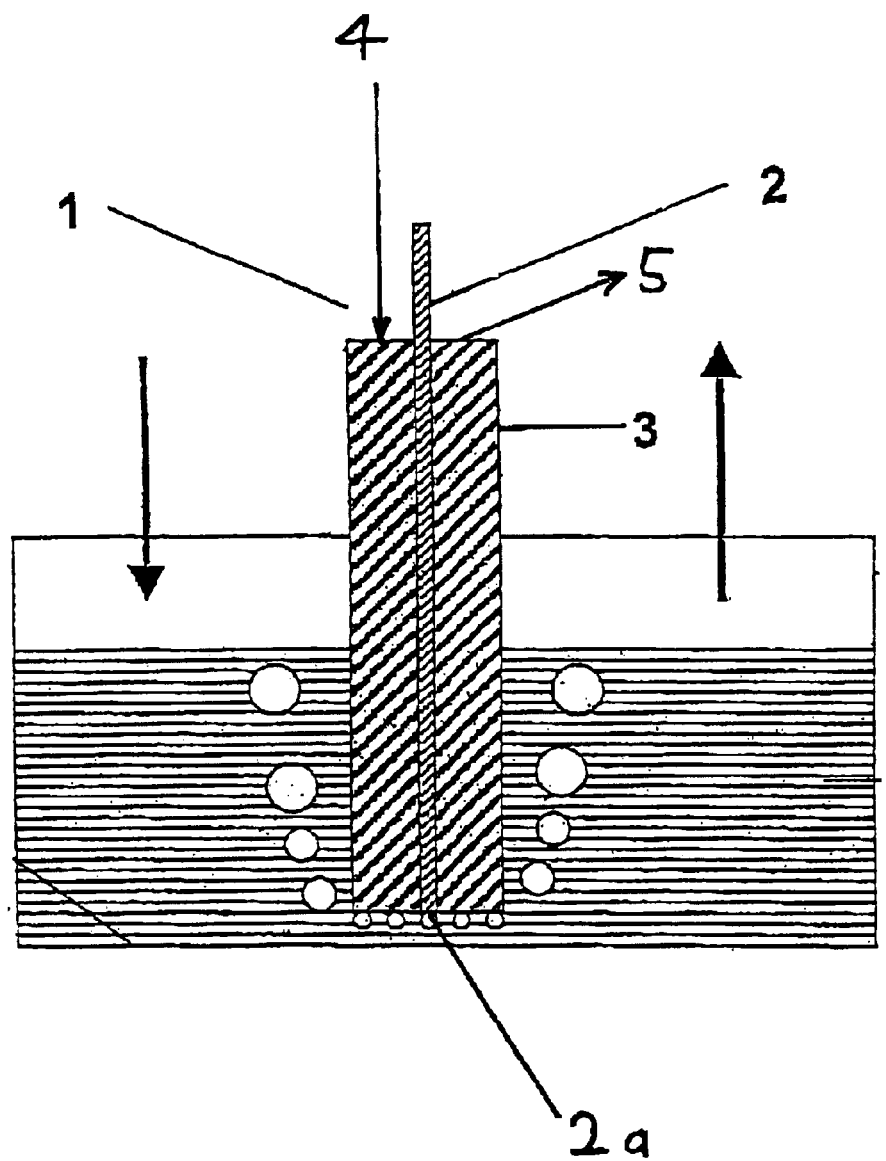

This invention relates to a device and a process for introducing gases into a hot medium.

In the continuous production of laser glass for high-performance lasers, the glass raw materials are melted in a melting basin. When leaving the melting basin, the water content is considerably above what is needed for use as laser glass. The glass is therefore fed into a purification and drying stage, in which a mixture that consists of oxygen and chlorine gas is introduced into the melt in different proportions. The temperatures in the melt are approximately 1400° C. Then, the glass is set for shaping with respect to homogeneity and temperature and brought into the desired shape.

To achieve the required low absorption in a light wave length above 2.7 µm, a very low water content, and therefore a very low content of hydroxyl groups, must be ensured. The required low water content can be achieved in the case of intermittent melting by a long holding time of the melt and introduction of oxygen.

In the case of a continuous aggregate, long holding times and processing times cannot be performed economically. As a very efficient desiccant, chlorine gas is introduced into the melt. Since platinum metal is usually resistant to the glass melt at the temperatures that occur, a platinum pipe is used for introducing chlorine gas. The latter is dipped from above into the crucible to a point just above the bottom. Chlorine gas is introduced via the platinum pipe. The chlorine gas bubbles through the melt from below. In this case, the drying action is carried out. Since the platinum pipe is located in the hot melt, it also reaches temperatures of above 1000° C. It has been shown that at these temperatures, a platinum pipe is perforated and partially dissolved by the aggressive chlorine gas within a short operating time. The function of the gas introduction is then not ensured, so that the water content increases to unacceptably high values. In addition, via the dissolved platinum, it results in an unacceptably high number of platinum pockets in the glass. As a result, the production must be halted after just a short time.

In the production of glasses that must meet high quality requirements, it is a common process to introduce gases into the glass melts to cause reactions determined by the gases that are introduced. By the introduction of oxygen or reducing gases, coloring polyvalent ions that are contained in the glass can be adjusted in a specific fashion in their oxidation stage to achieve a desired color of the glass or else to prevent an undesirable discoloration of the glass. In small melt aggregates, in this respect, usually suitably bent pipes that consist of materials that withstand the melting temperatures and that do not contaminate the melts, such as silica glass or platinum, are introduced into the melt from above to a point just above the bottom of the crucible.

In industrial aggregates, gases are also introduced into the melts at various points. For the most part, the so-called bubbling nozzles are used in a specific influencing of the flow into the glass-melting tanks. In such cases, generally oxygen, rare air or inert gases are used. Reactive gases can also exert influence on chemical reactions in the glass melt.

The standard processes for introducing gas into melts are not applicable in the continuous production of aggressive glass melts, especially phosphate glass melts for high-performance lasers. Platinum pipes that are dipped from above into the melts are partially dissolved and perforated in a short time, so that the pipe can no longer perform its function. In addition, the strong dissolution of the platinum results in the formation of a considerable number of extremely small platinum particles in the glass melt, by which glass that is produced from the melt is of no use as laser glass.

A replacement of the platinum feed pipe that is dipped from above into the melt by pipes of other materials, such as ceramic or silica glass, does not result in a permanent solution of the problem, since all materials dissolve in a few hours in the aggressive melts and thus are not suitable for continuous glass production.

An introduction of the gas through the bottom of the vessel that contains the melt was previously not possible because of the corrosive action of the aggressive melts, which destroyed all known materials. The corrosion and destruction of the gas feed device at the bottom of the melting vessel resulted in a draining-out of the entire melt and thus a considerable threat to personnel as well as a longer-term interruption of production.

The object of this invention is to provide a device and an economical and nonpolluting process, whereby gases are introduced into a hot medium over a longer period without damage or dissolution of the device by the gas occurring.

The object of the invention is achieved by a device for introducing gases in a hot medium, whereby the device contains a pipe for introducing gas and a cooling jacket that encases the pipe.

An aggressive gas is fed through the device according to the invention, whereby the contact surfaces of the device to the gas are kept below a critical temperature, above which the material of the device would react with the aggressive gas, by a suitable cooling.

In the device according to the invention, the parts that have contact with gases, such as chlorine gas, are adequately cooled. Thus, the pipe that is made of metal, such as platinum, is not hot while it is in contact with chlorine gas. By suitable cooling, the device according to the invention ensures that all metal surfaces that are not covered by glass and that can come into contact with the gases do not heat up above a critical temperature, in which the metals that are used are dissolved by the gases that are used. The cooling jacket encases the pipe, preferably up to its orifice.

According to a preferred embodiment of the invention, the cooled contact surfaces are coated with a layer that is chemically resistant to chlorine gas at the prevailing temperatures. The layer can consist of a thin platinum layer which is applied to another structural material. Plastics with a high fluorine content can also be used, however. By the cooling, it is ensured that the decomposition temperature of the plastic is not exceeded. In this embodiment, a considerable number of materials, such as steel, can be used as construction materials. As a result, the amount of noble metal that is used is considerably reduced, by which the device is significantly more economical both in production and in use.

In the device according to the invention, gas or a gas mixture, oil or an oil mixture, silicone oil or a silicone oil mixture, especially water or an aqueous solution, are used as coolants for the cooling jacket. This coolant is economical and nonpolluting.

The material of the contact surfaces of the device according to the invention preferably consists of platinum or a platinum alloy. The contact surfaces, uncoated, come into contact with the chlorine gas. Especially good results are achieved with this material.

The aggressive gas, such as chlorine, is introduced preferably into a glass-melting tank, a lower part thereof or a crucible by means of the device according to the invention.

In addition, for example, chlorine is introduced into refining parts and conditioning parts by means of the device according to the invention.

The process according to the invention is preferably performed continuously. In the continuous production of laser glass, an introduction of chlorine gas from below is impossible to date, since a leak at the bottom of the crucible caused all of the glass that was contained to drain out. This problem was remedied with the invention according to the invention.

The invention makes available a device with which aggressive gases, such as chlorine gas, are reliably introduced over an extended period into hot glass melts, without damage or dissolution of the device by the aggressive gas occurring. Besides pure or technical chlorine gas, gases containing chlorine, like $SiCl_4$ or $CCl_4$, or mixtures of chlorine gas, chlorine containing gases or other gases could be used as well.

The invention is explained in more detail based on a drawing.

DRAWINGS

Figure 2:
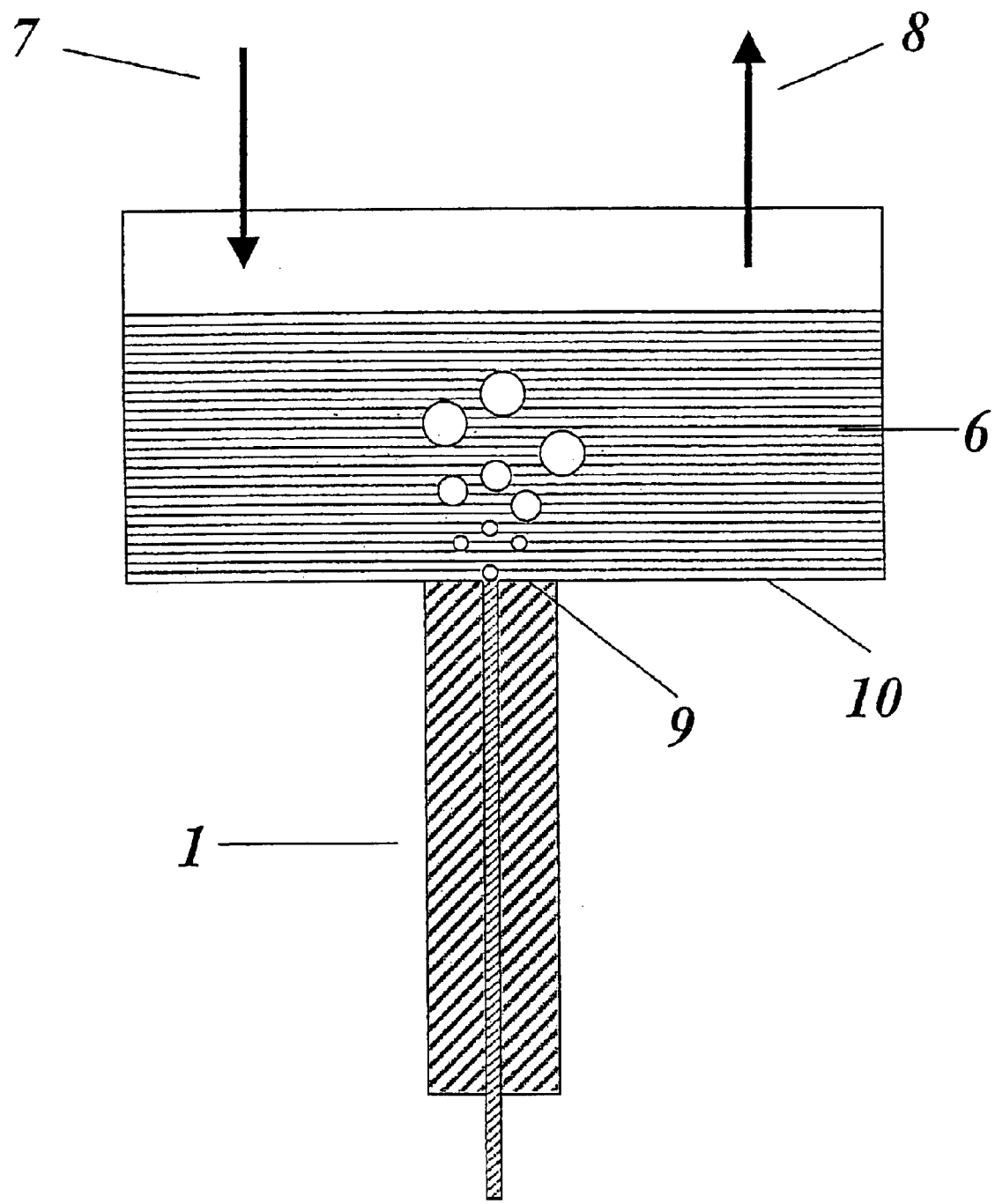
Figure 3:
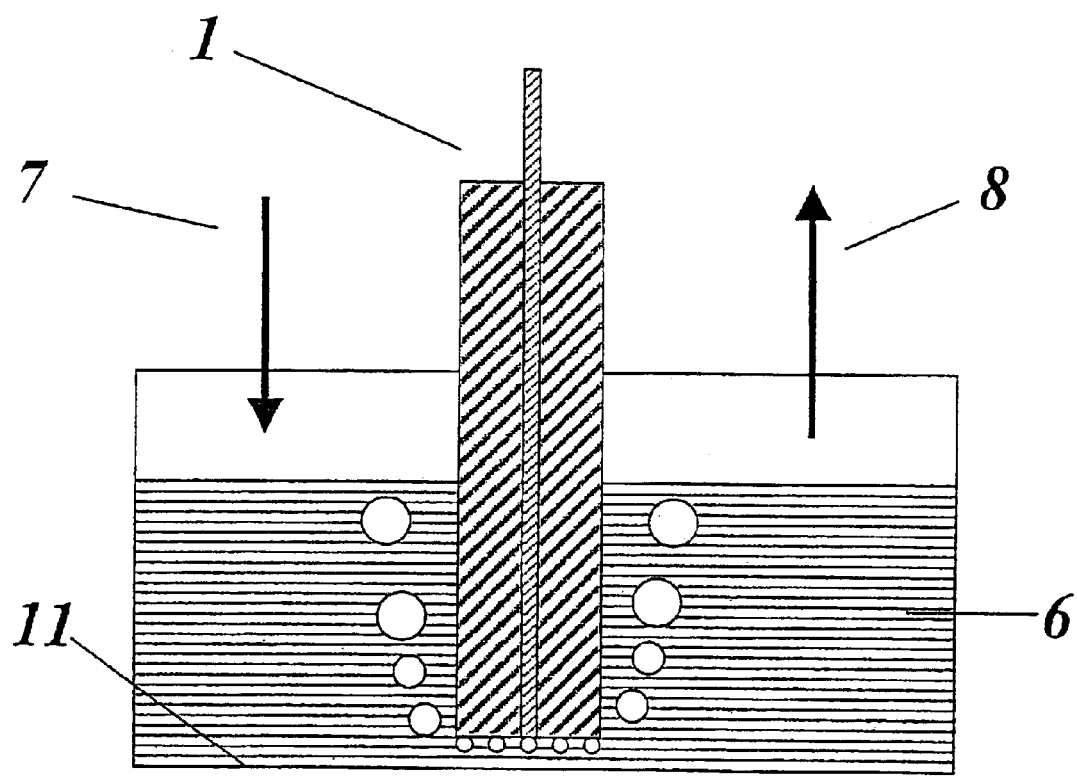

The drawing consists of FIGS. 1 to 3.

FIG. 1 shows: a device (1) according to the invention, whereby the reaction gas is fed through pipe (2). The coolant is introduced (4) into cooling jacket (3) and removed therefrom (5). Cooling jacket (3) encases pipe (2), preferably up to its orifice (2a).

FIG. 2 shows: device (1) according to the invention whereby the gas is introduced into melt (6) in the purification and drying stage from below. For melt (6), glass is sent to be melted (7) and drained off (8) for further processing. To this end, device (1) is fitted gastight into a recess (9) in bottom (10) of the purification and drying stage and sealed shut if necessary.

FIG. 3 shows: the purification and drying stage as in FIG. 2 with the difference that in device (1) according to the invention, the gas is introduced into melt (6) from above. To this end, device (1) dips from above into melt (6) to a point just above the bottom of crucible (11).

The variant embodiment according to FIG. 3 is preferably used where an existing unit must be added later to a gas feed device. Since the cooled surfaces that have contact with the glass melts are significantly larger than in FIG. 2, in this case the removal of heat from the melt is also greater. This must be compensated by a correspondingly stronger heating of the melt.

The entire disclosure of all applications, patents and publications, cited above and below, and of corresponding German Application No. 100 43 872.5, filed Sep. 4, 2000 is hereby incorporated by reference.

What is claimed is:

1. A device for introducing a gas into a hot medium, comprising a pipe having an orifice and a cooling jacket that encases said pipe to its orifice, wherein the surface of the pipe and/or cooling jacket that is in contact with the gas that is to be introduced is platinum or a platinum alloy.

2. A device according to claim 1, wherein a coolant is present in the cooling jacket wherein said coolant is a gas or a gas mixture, an oil or an oil mixture, a silicone oil or a silicone oil mixture, water or an aqueous solution.

3. A combination of a device according to claim 1 and a hot medium, wherein the hot medium is melted glass.

4. A combination of a device according to claim 1 and a glass-melting tank or a crucible, wherein a hot medium is in the glass-melting tank or in the crucible.

5. A combination according to claim 4, wherein the device reaches into the hot medium from the surface of the hot medium.

6. A combination according to claim 5, wherein the hot medium is melted glass.

7. A device according to claim 1, wherein the pipe is made of steel and has a platinum or platinum alloy layer on the surface that is to be in contact with the gas that is to be introduced.

8. A device according to claim 1, wherein the pipe is made of a material other than platinum or a platinum alloy and has a platinum or platinum alloy layer on the surface that is to be in contact with the gas that is to be introduced.

9. A device for introducing a gas into a hot medium, comprising a pipe and a cooling jacket that encases said pipe, wherein the pipe is made of a plastic with fluorine content and has a platinum or platinum alloy layer on the surface that is to be in contact with the gas that is to be introduced.

10. A combination of (1) a device for introducing a gas into a hot medium, said device comprising a pipe and a cooling jacket that encases said pipe, wherein the surface of the pipe and/or cooling jacket that is in contact with the gas that is to be introduced is platinum or a platinum alloy and (2) a gas that is introduced, wherein the gas that is introduced is chlorine gas or a mixture of gases containing chlorine gas.

11. A process for introducing a gas into a hot medium, comprising passing the gas into the hot medium via a device according to claim 1.

12. A process according to claim 11, wherein the cooling jacket is cooled with water or an aqueous solution.

13. A process according to claim 11, wherein the gas is chlorine gas or a mixture of gases containing chlorine gas.

14. A process according to claim 11, wherein the hot medium is melted glass.

15. A process according to claim 11, wherein the gas is introduced into a glass-melting tank or into a crucible.

16. A process according to claim 11, wherein the process is performed continuously.

17. A method for preparing a laser glass comprising introducing a gas into a glass melt from which the laser glass is to be produced through a device which is in accord to claim 1.

18. A method according to claim 17, wherein the method is performed continuously.

19. A method according to claim 17, wherein the gas is chlorine gas or a mixture of gases containing chlorine gas.

20. A method according to claim 17, wherein the pipe is made of steel and has a platinum or platinum alloy layer on the surface that is to be in contact with the gas that is to be introduced.

* * * * *

UNITED STATES PATENT AND TRADEMARK OFFICE
CERTIFICATE OF CORRECTION

PATENT NO. : 6,912,874 B2
DATED : July 5, 2005
INVENTOR(S) : Kunert

It is certified that error appears in the above-identified patent and that said Letters Patent is hereby corrected as shown below:

<u>Title page,</u>
Item [75], Inventors, should read:
-- Christian Kunert
  Werner Kiefer
  Hildegard Roemer
  Uwe Kolberg
  Alfred James Thorne
  Paul Joseph Finnerty --.

Signed and Sealed this

Sixth Day of June, 2006

JON W. DUDAS
*Director of the United States Patent and Trademark Office*